US011233757B1

(12) United States Patent
Yan

(10) Patent No.: US 11,233,757 B1
(45) Date of Patent: *Jan. 25, 2022

(54) SYSTEMS AND METHODS FOR ELECTRONIC GROUP EXCHANGE OF DIGITAL BUSINESS CARDS DURING VIDEO CONFERENCE, TELECONFERENCE OR MEETING AT SOCIAL DISTANCE

(71) Applicant: TraDove, Inc., Palo Alto, CA (US)

(72) Inventor: Jun Yan, Palo Alto, CA (US)

(73) Assignee: TraDove, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/144,090

(22) Filed: Jan. 7, 2021

Related U.S. Application Data

(63) Continuation of application No. 16/927,672, filed on Jul. 13, 2020, now Pat. No. 10,999,227.

(Continued)

(51) Int. Cl.
*H04L 12/58* (2006.01)
*H04L 29/08* (2006.01)
*G06K 7/14* (2006.01)

(52) U.S. Cl.
CPC ............ *H04L 51/08* (2013.01); *H04L 51/046* (2013.01); *H04L 67/306* (2013.01); *G06K 7/1417* (2013.01)

(58) Field of Classification Search
None
See application file for complete search history.

(56) References Cited

U.S. PATENT DOCUMENTS

| 5,493,105 A | * | 2/1996 | Desai | G06K 13/08 235/375 |
| 5,774,117 A | * | 6/1998 | Kukkal | G06T 11/00 715/753 |

(Continued)

FOREIGN PATENT DOCUMENTS

| KR | 20110063406 A | * | 6/2011 |
| KR | 20200052517 | | * 11/2018 |

(Continued)

OTHER PUBLICATIONS

Espacenet (Patent Translate of KR20200052517), How to exchanging business cards with multiple people using QR code, 6 pgs. (Year: 2020).

*Primary Examiner* — Backhean Tiv
(74) *Attorney, Agent, or Firm* — Sheppard Mullin Richter & Hampton LLP

(57) ABSTRACT

Provided is a system and computer readable medium for electronic group exchange of digital business cards, that includes a computing system comprising a server configured to store data of business cards associated with client devices, one or more processors; and a memory storing instructions that, when executed by the one or more processors, causes the one or more processors to perform a group exchange of digital business cards among all devices in the group. The digital business cards may be automatically exchanged among different devices in response to detecting, from the different devices, scans of a group QR code or a scannable code, detecting inputs of a group numeric or alphanumeric code, detecting a selection of nearby devices with which to exchange digital business cards, or detecting devices that are participating in a conference setting.

20 Claims, 15 Drawing Sheets

Related U.S. Application Data

(60) Provisional application No. 63/048,642, filed on Jul. 6, 2020.

(56) References Cited

U.S. PATENT DOCUMENTS

| | | | | |
|---|---|---|---|---|
| 5,818,442 | A * | 10/1998 | Adamson | G06Q 10/10 715/753 |
| 5,982,520 | A * | 11/1999 | Weiser | G06F 1/1626 398/107 |
| 6,201,859 | B1 * | 3/2001 | Memhard | H04M 3/56 348/E7.083 |
| 6,533,171 | B1 * | 3/2003 | Porter | G06Q 10/107 235/380 |
| 6,783,060 | B2 * | 8/2004 | Marappan | G06K 19/07 235/375 |
| 6,873,861 | B2 * | 3/2005 | Awada | H04M 1/2757 455/566 |
| 7,139,724 | B1 * | 11/2006 | Dworkin | G06Q 30/02 705/14.36 |
| 7,925,620 | B1 * | 4/2011 | Yoon | G06Q 10/109 707/609 |
| 8,005,904 | B2 * | 8/2011 | Yokoyama | G06Q 10/10 709/206 |
| 8,108,240 | B2 * | 1/2012 | Gropper | G06Q 30/02 705/7.18 |
| 8,117,024 | B2 | 2/2012 | Dane | |
| 8,156,330 | B2 * | 4/2012 | Yu | G06Q 20/3821 713/168 |
| 9,760,645 | B1 * | 9/2017 | Park | G06F 3/011 |
| 10,237,713 | B1 * | 3/2019 | Lifschultz | H04W 4/80 |
| 10,397,391 | B1 * | 8/2019 | Czajka | H04M 1/72484 |
| 10,999,227 | B1 * | 5/2021 | Yan | H04L 67/306 |
| 2001/0020239 | A1 * | 9/2001 | Ukigawa | G06Q 10/10 |
| 2002/0087353 | A1 * | 7/2002 | Han | G06Q 30/02 705/39 |
| 2002/0128030 | A1 * | 9/2002 | Eiden | H04B 13/005 455/519 |
| 2002/0156895 | A1 * | 10/2002 | Brown | G06Q 10/00 709/226 |
| 2004/0025072 | A1 * | 2/2004 | Mau | H04L 41/085 713/400 |
| 2004/0203381 | A1 * | 10/2004 | Cahn | H04B 5/02 455/41.2 |
| 2005/0103838 | A1 * | 5/2005 | Slotkin | G06Q 10/10 235/380 |
| 2006/0075050 | A1 * | 4/2006 | Kanatani | G06Q 20/3821 709/206 |
| 2006/0075231 | A1 * | 4/2006 | Yu | G06Q 10/10 713/168 |
| 2006/0136251 | A1 * | 6/2006 | Sung | G06Q 10/107 709/206 |
| 2006/0223556 | A1 * | 10/2006 | Xu | H04L 67/18 455/502 |
| 2006/0276205 | A1 * | 12/2006 | Bengtsson | H04W 8/14 455/457 |
| 2006/0293903 | A1 * | 12/2006 | Ramanathan | G06Q 30/0257 709/206 |
| 2006/0293904 | A1 * | 12/2006 | Ramanathan | G06Q 10/00 709/206 |
| 2006/0293905 | A1 * | 12/2006 | Ramanathan | G06Q 10/10 709/206 |
| 2007/0185907 | A1 * | 8/2007 | Kume | G06Q 30/02 |
| 2007/0264988 | A1 * | 11/2007 | Wilson, Jr. | H04L 67/04 455/416 |
| 2007/0265033 | A1 * | 11/2007 | Brostrom | H04M 1/72412 455/557 |
| 2008/0082557 | A1 * | 4/2008 | Ohara | G06Q 10/00 |
| 2008/0125148 | A1 * | 5/2008 | Zhao | H04M 1/2757 455/466 |
| 2008/0133343 | A1 * | 6/2008 | Hyder | G06Q 10/06 705/321 |
| 2009/0088215 | A1 * | 4/2009 | Caspi | G10L 17/00 455/563 |
| 2009/0089055 | A1 * | 4/2009 | Caspi | H04M 3/56 704/235 |
| 2009/0216839 | A1 * | 8/2009 | Yokoyama | G06F 21/6245 709/206 |
| 2009/0265794 | A1 * | 10/2009 | Apelqvist | G06Q 10/10 726/30 |
| 2009/0276209 | A1 * | 11/2009 | Dane | G06Q 10/063112 704/9 |
| 2010/0280904 | A1 * | 11/2010 | Ahuja | H04L 12/185 705/14.58 |
| 2011/0055559 | A1 * | 3/2011 | Li | H04L 9/0894 713/165 |
| 2012/0083253 | A1 * | 4/2012 | Van Der Vis-Kruijswijk | G06Q 10/10 455/414.1 |
| 2013/0043302 | A1 * | 2/2013 | Powlen | G06Q 50/01 235/375 |
| 2013/0100009 | A1 * | 4/2013 | Willis | G06F 3/0425 345/156 |
| 2013/0290110 | A1 * | 10/2013 | LuVogt | G06F 16/9535 705/14.66 |
| 2013/0346331 | A1 * | 12/2013 | Giovannetti | G06F 16/252 705/320 |
| 2014/0108289 | A1 * | 4/2014 | Eitan | G06F 16/9554 705/342 |
| 2014/0143675 | A1 * | 5/2014 | Lee | G06Q 10/107 715/739 |
| 2014/0172784 | A1 * | 6/2014 | Choi | G06F 16/21 707/609 |
| 2014/0207682 | A1 * | 7/2014 | Wolfond | G06Q 20/3276 705/44 |
| 2014/0297547 | A1 * | 10/2014 | Kruglick | G06Q 10/1053 705/319 |
| 2014/0359038 | A1 * | 12/2014 | Wen | H04L 51/20 709/206 |
| 2014/0365395 | A1 * | 12/2014 | Arguelles | G06Q 10/10 705/342 |
| 2015/0039525 | A1 * | 2/2015 | Frazier | G06F 16/285 705/319 |
| 2015/0094097 | A1 * | 4/2015 | Fraccaroli | H04W 4/02 455/456.3 |
| 2015/0100356 | A1 * | 4/2015 | Bessler | G06Q 30/01 705/7.12 |
| 2015/0127565 | A1 * | 5/2015 | Chevalier | G06Q 30/00 705/319 |
| 2015/0189028 | A1 * | 7/2015 | Sayed | H04W 4/021 709/204 |
| 2015/0227632 | A1 * | 8/2015 | Lunardi | G06F 16/337 707/722 |
| 2015/0372719 | A1 * | 12/2015 | Greene | H04B 5/0031 455/41.1 |
| 2017/0278068 | A1 * | 9/2017 | Xing | G06F 1/1626 |
| 2017/0279314 | A1 * | 9/2017 | Ding | H02J 50/80 |
| 2019/0034539 | A1 * | 1/2019 | Gavrielides | G06F 16/1748 |
| 2020/0226695 | A1 * | 7/2020 | Lee | G06Q 10/06311 |
| 2020/0293732 | A1 * | 9/2020 | Han | H04W 4/80 |
| 2020/0320458 | A1 * | 10/2020 | Loreto | G06F 16/9024 |

FOREIGN PATENT DOCUMENTS

| | | |
|---|---|---|
| KR | 102061252 B1 * | 12/2019 |
| KR | 10-2020-0052517 A | 5/2020 |

* cited by examiner

SYSTEMS AND METHODS FOR ELECTRONIC GROUP EXCHANGE OF DIGITAL BUSINESS CARDS DURING VIDEO CONFERENCE, TELECONFERENCE OR MEETING AT SOCIAL DISTANCE

CROSS-REFERENCE TO RELATED APPLICATION

This application is a continuation of U.S. patent application Ser. No. 16/927,672, filed Jul. 13, 2020, which claims the benefit under 35 U.S.C § 119 (e) of the U.S. Provisional Application Ser. No. 63/048,642, filed Jul. 6, 2020, the contents of which are incorporated herein in its entirety.

BACKGROUND

The present disclosure relates generally to electronic group exchange of digital business cards, for example, touchless multiparty business card exchange during a video conference, teleconference, or within social distancing constraints.

The Covid-19 pandemic is a catalyst that has resulted in rapid, sweeping changes in manners of social and business interaction. For example, video-conferencing and teleconferencing have become more commonplace and have largely supplanted traditional face-to-face meetings. Long-established events such as conferences, trade shows, and office visits have been replaced by virtual meetings or have implemented social distancing practices for protection purposes. Accordingly, the practice of exchanging paper business cards needs to be adapted to the current reality of virtual meetings and social distancing guidelines or regulations, as addressed by the present disclosures, which facilitates touchless exchange of business cards and other information.

In such a manner, efficient and touchless business card exchange among a group of devices may be facilitated, in which every device transmits a business card to multiple other devices and receives business cards from the multiple other devices together, rather than having to transmit and receive business cards one-by-one to different users. For example, even if only three nearby people exchanged business cards with one another in a conventional manner, three separate sending and three separate receiving interactions would be required. Using this touchless business card exchange described in this application, a single interaction would seamlessly exchange business cards among a group.

SUMMARY

Described herein are systems and methods for providing automatic exchange of digital, electronic, or virtual business cards in response to scanning and/or capturing a QR code, barcode, or other scannable code, inputting a numeric or alphanumeric code, or selection by a device associated with a nearby user. The systems may comprise a computing or client device, or a computing system which may comprise a cloud server and/or processor. In some embodiments, a computing system may comprise a server configured to store data of business cards associated with client devices, the data comprising, for each entity of the entities, a name, a title associated with the name, contact information associated with the name, and an occupation associated with the name; one or more processors; and a memory storing instructions that, when executed by the one or more processors, causes the one or more processors to perform: receiving a group QR code, barcode, or scannable code created by a client device of the client devices; detecting scans and/or captures of the group QR code, barcode, or the scannable code from second client devices of the client devices; and in response to detecting the scans and/or captures, automatically exchanging the data among the second client devices and the client device.

In some embodiments, a computing system may comprise a server configured to store the aforementioned data of business cards. The computing system may further comprise one or more processors and a memory storing instructions that, when executed by the one or more processors, causes the one or more processors to perform: receiving a group code created by a client device of the client devices, the group code comprising a group numeric code or a group alphanumeric code; detecting inputs of the group code from at least one second client device of the client devices; and in response to detecting the inputs of the group numeric or the group alphanumeric code, automatically exchanging the data among the at least one second client device and the client device. Thus the exchange could be one-to-one or among more than two devices.

In some embodiments, the instructions may cause the one or more processors to perform: receiving a request to exchange the data from a client device of the client devices; detecting other client devices, from the client devices, that are within a threshold radius of the client device, using a GPS, Bluetooth, or other location based technologies; transmitting, to the client device, information of the other client devices; receiving, from the client device, a selection, from the other client devices, of second client devices with which to exchange the data; and automatically exchanging the data among the client device and the selected second client devices.

In some embodiments, the instructions may cause the one or more processors to perform: detecting second client devices, of the client devices, that are participating in a conference setting, wherein a quantity of the second client devices is greater than two; and automatically exchanging the data among the detected second client devices.

In some embodiments, the server or a local device associated with a particular client device stores or backs up a plurality of business cards that all describe a single user associated with the particular client device, and the automatically exchanging the data comprises: extracting data regarding individual characteristics of each of other client devices, the other client devices being comprised within or as part of a group consisting of the second client devices and the client device, the individual characteristics comprising any of industries, professions, fields, specialties, or titles associated with respective users of the other client devices; transmitting the extracted data to the particular client device; receiving, from the particular client device or manually from a user associated with the particular client device, a selection of one or more particular business cards, out of the plurality of business cards, to be provided to each of the other client devices, the selection being based on the extracted data; and transmitting the selected one or more particular business cards to the other client devices.

In some embodiments, the automatically exchanging the data comprises: determining whether to transfer, from a particular client device to a second particular client device, business card data describing another user of another device, based on a selection or an input by a user of the particular client device or based on a degree of similarity between a profession, specialty, title, or field of practice of the another user and a user of the second particular client device; and transferring the business card data in accordance with the determination, with or without permission from the another user. Permission from the another user may or may not be received.

Various embodiments of the present disclosure provide an analogous method implemented by a computing system including one or more processors and storage media storing machine-readable instructions, wherein the method is performed using the one or more processors. Various embodiments of the present disclosure provide a computer readable storage medium including instructions that, when executed by one or more processors of a computing system, cause the computing system to perform the aforementioned or analogous steps associated with the server and client devices. The steps may include the storing in a server, receiving, detecting, transmitting, automatic exchanging, transmitting, and determining steps described above.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1A:
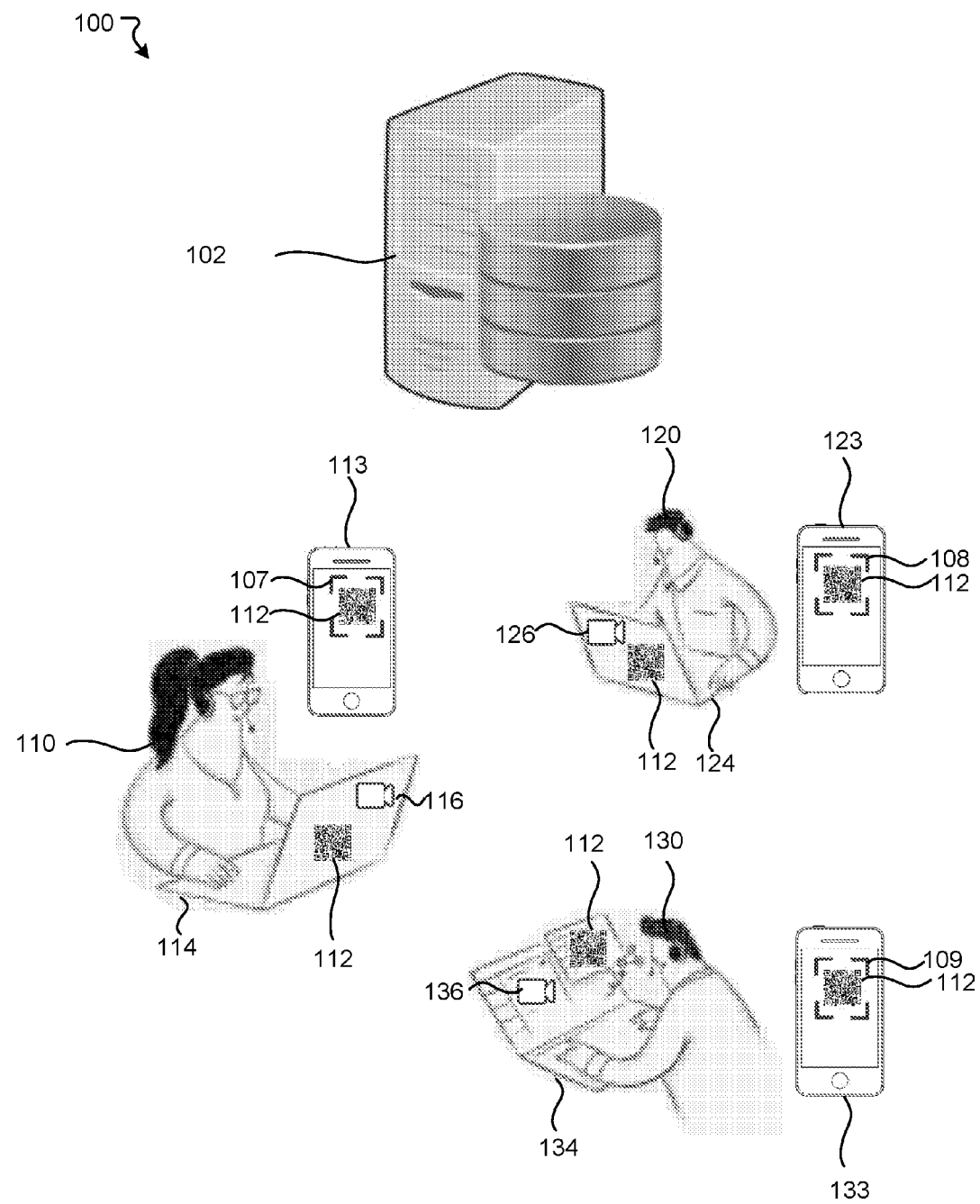
FIG. 1A illustrates an example environment in which touchless business card exchange may be facilitated, in a video conference setting, according to some embodiments of the present disclosure.

Scenarios with which to implement business card exchange in a context of social distancing regulations or in virtual settings include a video conference setting, a teleconference setting, and a face-to-face setting at a social distance. During the video conference setting, a device, which may be a personal computer, handheld device such as a mobile phone, tablet or any other device having a video conference feature, may, using the device and/or a central server such as a cloud-based server, generate or create a QR code, known as a group QR code, which may be received by all devices participating in the current video conference setting. In some embodiments, as will be described below with respect to FIG. 1A, one device receives the group QR code and a separate device scans and/or captures the QR code and exchanges the business cards. Although the foregoing describes a group QR code, it is contemplated that a barcode or other scannable code may also be implemented in place of, or in addition to, the group QR code. Any devices that have scanned and/or captured the group QR code may exchange business card information, either automatically or after authorizing or approving the business card information exchange. In some embodiments, instead of or in addition to the group QR code in the video conference setting, a group numeric code or group alphanumeric code may be created. Once the group numeric code or the group alphanumeric code is inputted, the business card information may be exchanged among all devices that have inputted the group numeric code or the group alphanumeric code.

During the teleconference setting, a device may create a group numeric code or group alphanumeric code which is received by all other devices participating in the teleconference setting. Any devices that have inputted the group numeric code or the group alphanumeric code may exchange business card information, either automatically or after authorizing or approving the business card information exchange. In some embodiments, a device may receive the group numeric code or the group alphanumeric code using the teleconference setting, and a separate device may exchange the business cards upon entry or receipt of the group numeric code or the group alphanumeric code.

During the face-to-face setting, a device, together with a cloud server and/or processor, may automatically locate other devices using GPS, Bluetooth, or other location based technologies, for example, within a predetermined radius or distance of the device, select a subset of the devices, and initiate a business card exchange without a QR code, numeric code, or alphanumeric code. In other embodiments, during the face-to-face setting, a device may also initiate the request to exchange the business card information by initiating a group and creating a group code such as a group QR code, barcode, or other scannable code, a group numeric code, and/or a group alphanumeric code, to be shared among the group. Any devices that have scanned and/or captured the group QR code, barcode, or other scannable code, or inputted the group numeric or group alphanumeric code may exchange the business card information with the multiple other devices that have also scanned and/or captured, or inputted the respective codes, either automatically or after authorizing or approving the business card information exchange.

Business card information, in some embodiments, may comprise a name, contact information associated, title such as a job title, company information associated with the name, a level or years of experience, one or more occupations or specialties, one or more photographs, one or more multimedia files, one or more text files, one or more reviews or ratings, and/or one or more further contacts related to the occupations or specialties. In some embodiments, as will be described with respect to FIG. 1A, and as applicable to the exemplary environments depicted in FIGS. 1F, 2, 3A, 3B, 4A, 4B, and 5, a device may store multiple business cards belonging to a single user associated with the device, and select one business card to exchange, for example, based on a target audience. In some embodiments, a user of the device may manually select one particular business card to exchange with another device and the device may accept the manual selection. In some embodiments, the device may automatically select one particular business card to exchange with another device based on a profession, field, specialty, and/or title of an entity associated with or using that other device. For instance, if another device that is exchanging business cards with the device belongs to a user in a similar profession, field, or specialty as the user of the device, or is likely to frequency interact or transact with the entity, the device may select a business card having more details regarding an experience level or services provided, compared to a scenario in which the device belongs to an entity in a different or dissimilar profession, field, or specialty.

FIG. 1A illustrates an example environment 100 in which touchless business card exchange may be facilitated, in particular, in a video conference setting. In FIG. 1A, an entity 110, which may be a person, may utilize a device 114 having videoconferencing features 116 and further utilize another device 113 that scans and/or captures an incoming or received QR code, if necessary, and/or exchanges business cards using an application, module, and/or widget. The other device 113 may include a scanner 107, which could be used to scan incoming QR codes, though not specifically used in FIG. 1A. The device 114 may be a computer, laptop, handheld device such as a mobile phone or tablet, or any device having video conference capabilities and one or more processors to conduct a videoconference in order to transmit, share, and/or receive a QR code. The other device 113, separate from the device 114, may be a mobile phone, tablet, handheld device, computer, or laptop.

Figure 1B:
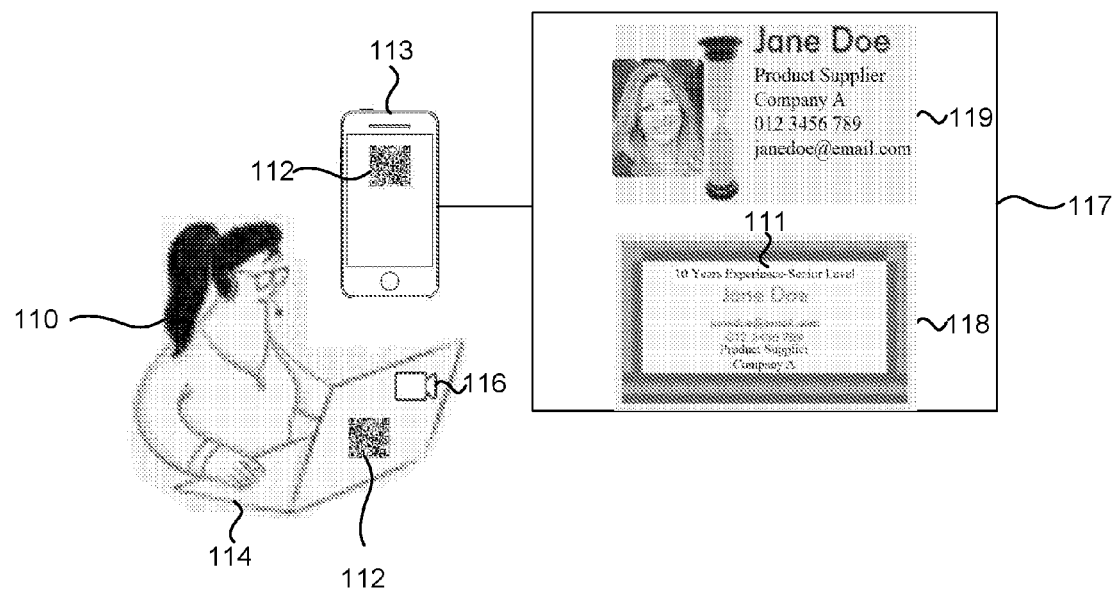
FIGS. 1B-1E illustrate exemplary implementations in accordance with the example environment of FIG. 1A, according to some embodiments of the present disclosure.
Figure 1C:
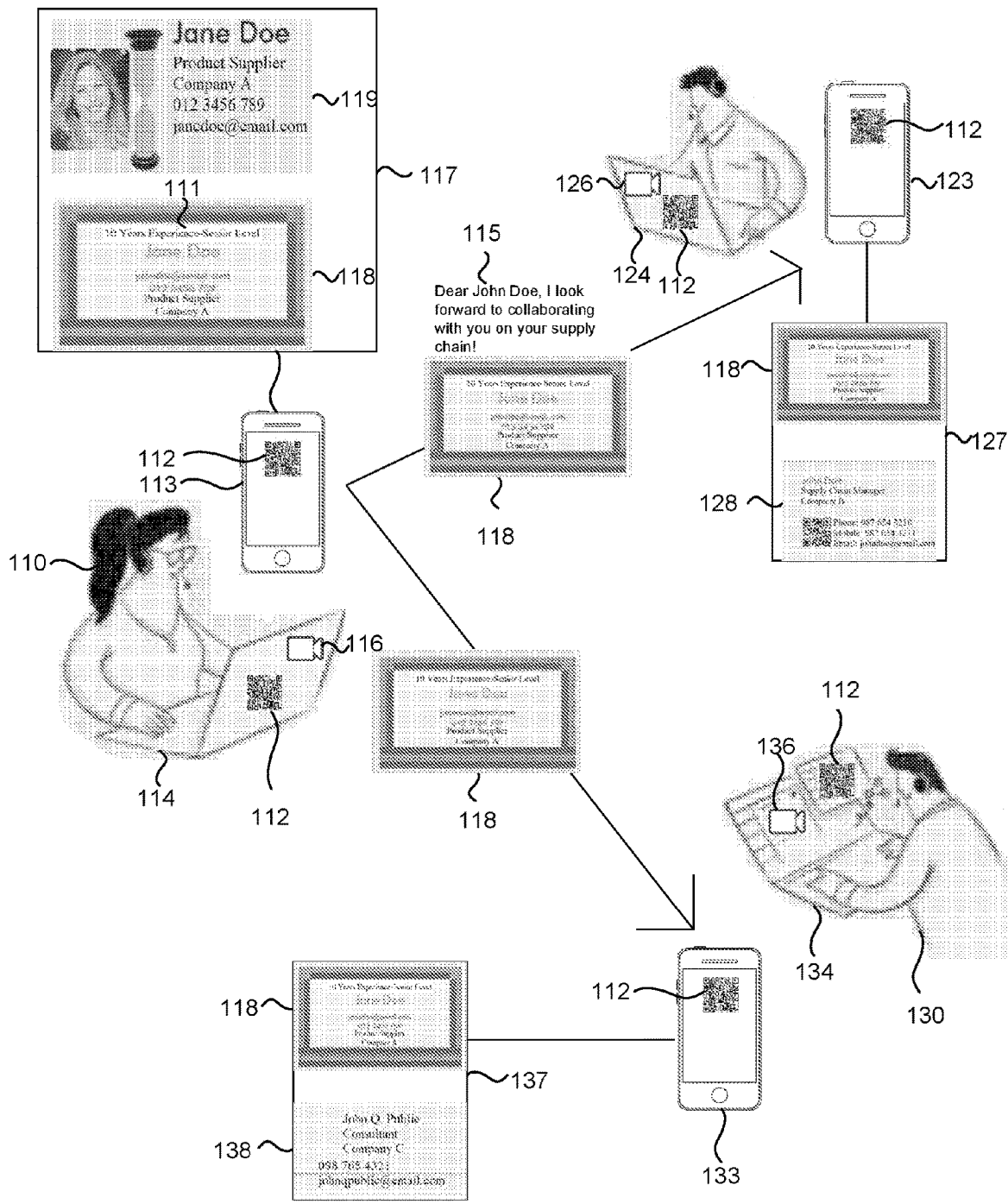
Figure 1D:
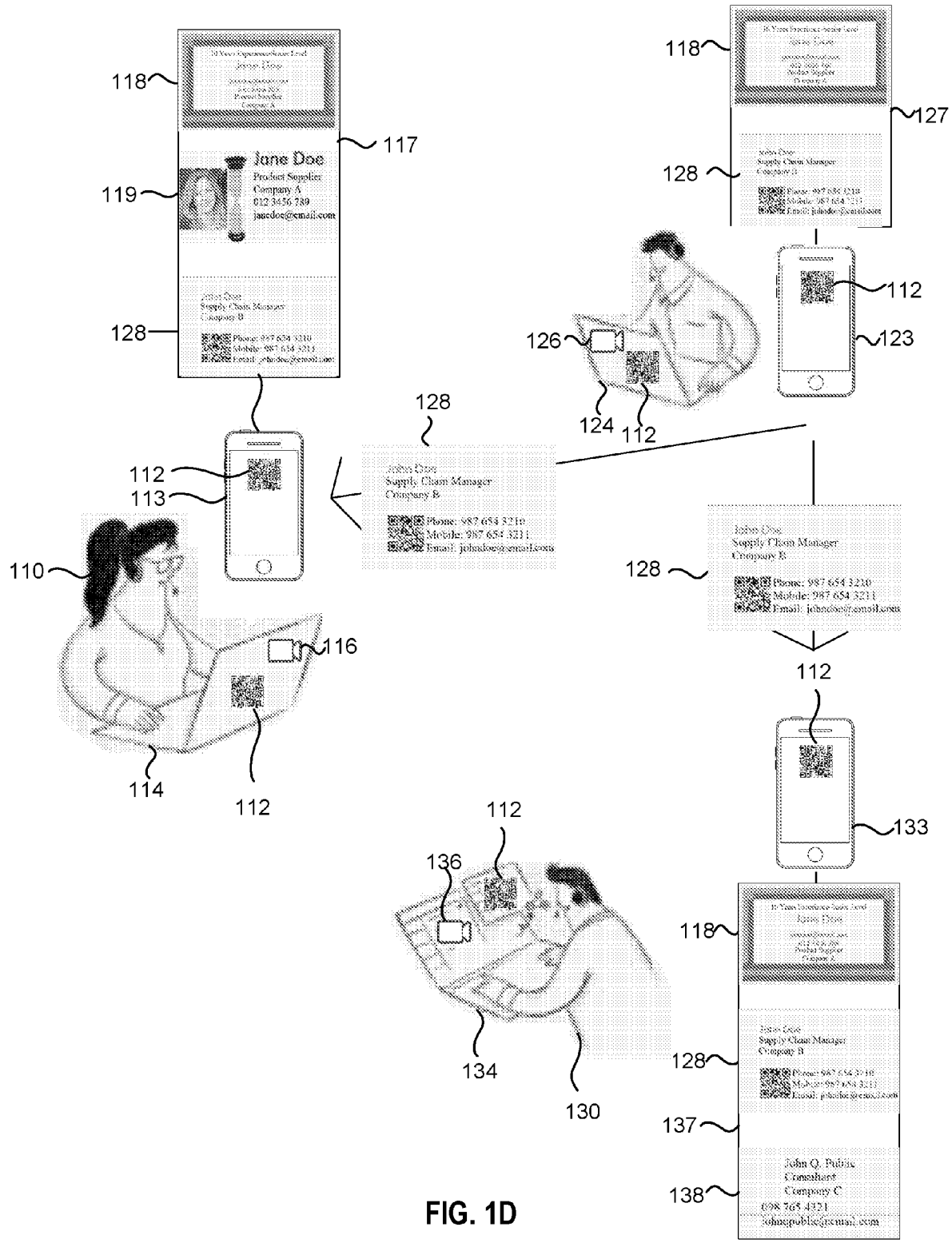
Figure 1E:
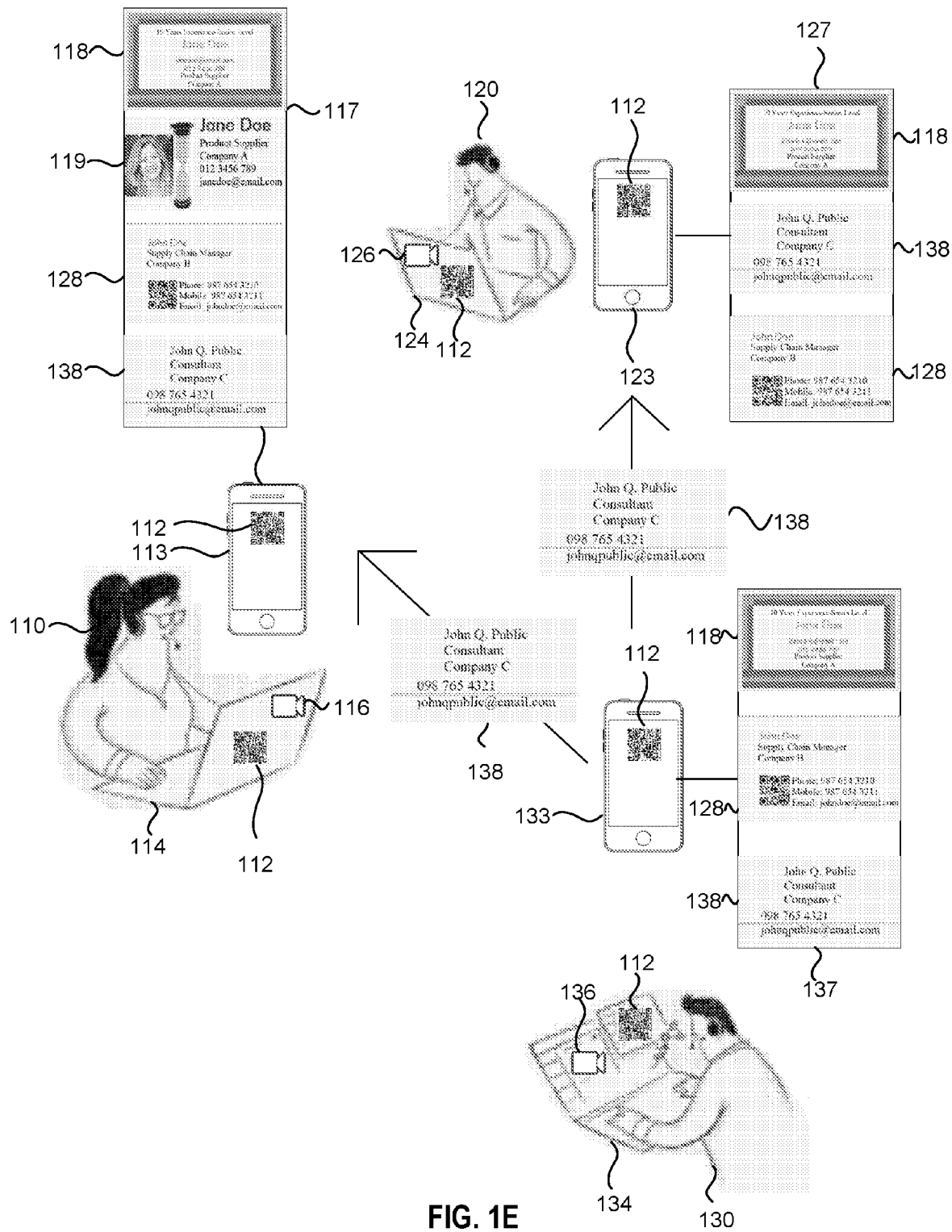
Figure 1F:
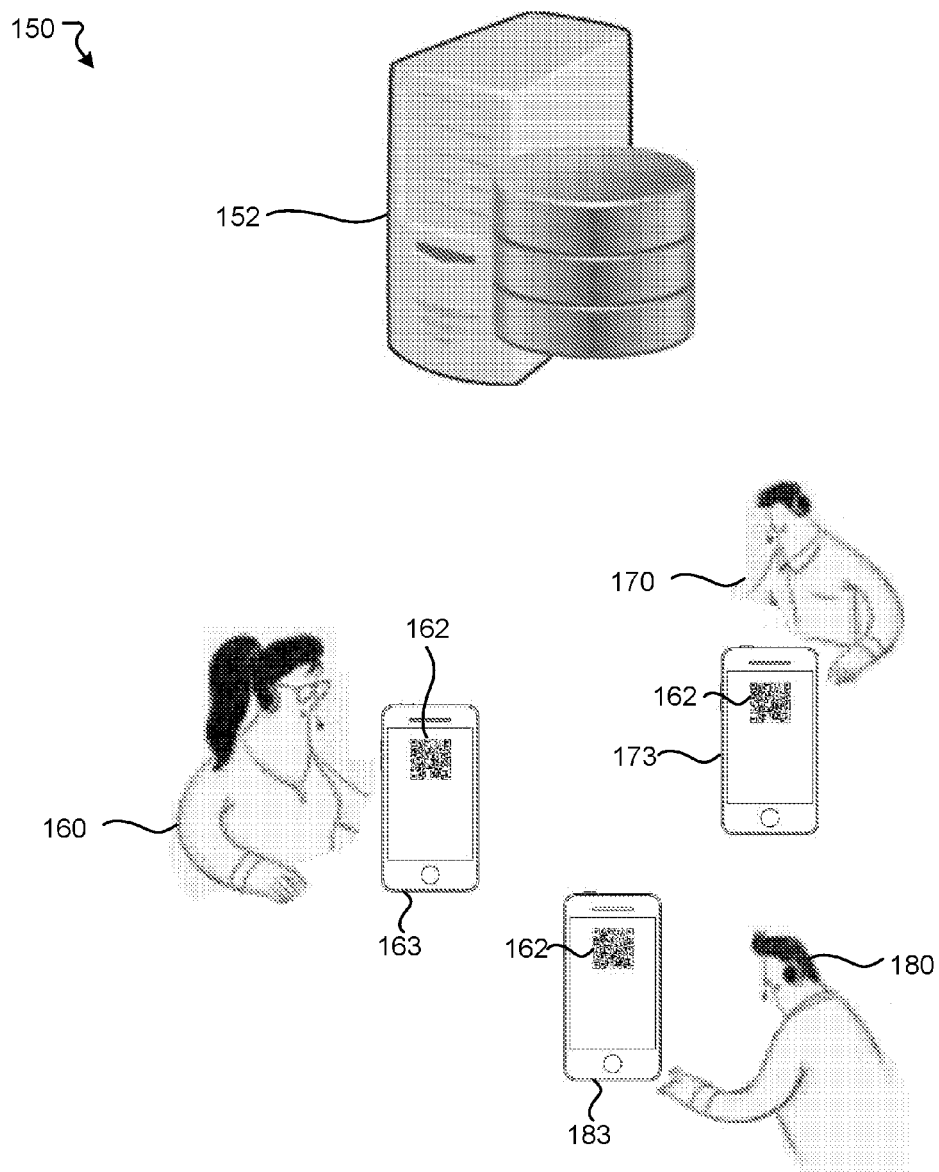
FIG. 1F illustrates an alternative example environment, in a video conference setting, to that shown in FIG. 1A.
Figure 2:
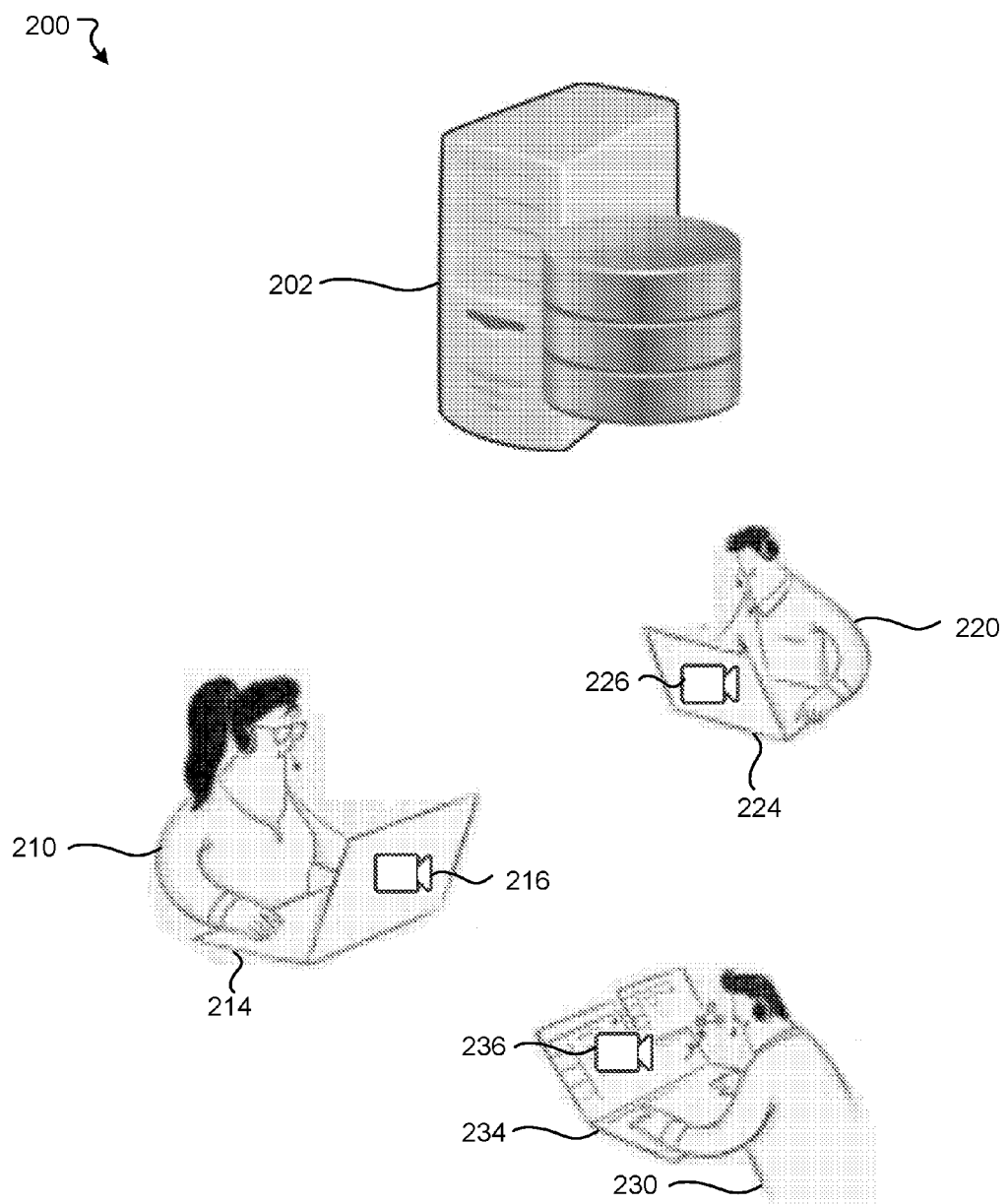
FIG. 2 illustrates an example environment in which touchless business card exchange may be facilitated, in a video conference setting, according to some embodiments of the present disclosure.

In some embodiments, as will be shown in FIGS. 1F and 2, a single device, rather than two separate devices, may carry out electronic business card exchange, in situations in which the QR code is electronically transmitted and/or in which a device with videoconferencing features also includes an application, module, and/or widget to perform exchange of business cards with or without using QR codes. In other embodiments, as illustrated in FIG. 1A, if scanning and/or capturing of the QR code is required, the device 114 may generate, for example, using an application, module, and/or widget, a group QR code 112 and share the group QR code 112 among all participants in the video conference setting onto respective screens or displays of the devices belonging to the participants. The device 114 may send the group QR code 112 to a central server and/or processor 102 such as a cloud-based server and processor, so that the central server and/or processor 102 can check whether and when each of devices among which the QR code 112 is being shared have scanned and/or captured the group QR code 112. Although the foregoing description describes a group QR code, it is contemplated that a barcode or other scannable code may also be implemented in place of, or in addition to, the group QR code 112. In some embodiments, the same device 114 may generate the group QR code 112 and also transmit or share the group QR code 112 to other devices. In other embodiments, a device that generates the group QR code 112 may be different from a device that transmits or shares the group QR code using the videoconferencing features 116. For example, the other device 113 may generate the group QR code 112 and the device 114 may scan and/or capture the generated group QR code 112 and transmit or share the group QR code 112 using the videoconferencing features 116. The other participants in the video conference setting may include a second device 124 and a third device 134 belonging to or associated with a second entity 120 and a third entity 130, respectively. The second device 124 and the third device 134 may each be a computer, laptop, handheld device such as a mobile phone or tablet, or any device having video conference capabilities and one or more processors to perform at least some tasks associated with business card exchange. For example, the second device 124 and the third device 134 may receive and/or display the group QR code 112. Afterwards, the group QR code may be scanned and/or captured by a second other device 123 and a third other device 133, respectively, to initiate business card exchange by the second other device 123 and the third other device 133. In some alternate embodiments, as shown in FIG. 1F, the receiving and/or displaying of the group QR code 112 may be done on a same device as the exchanging of the business cards, not separate devices.

In one embodiment, as shown in FIG. 1A, the device 114 may provide the group QR code 112 to the second device 124 and the third device 134 by using a videocamera of the device 114 to share the group QR code 112 in the videoconference setting. Thus, the second device 124 and the third device 134 could receive the group QR code 112 on their respective screens or displays. The group QR code 112 could be accessible and visible to each of the individual devices through respective screens or displays of the second device 124 and the third device 134 without an electronic transmission by the device 114 of the group QR code 112. Once the second device 124 and the third device 134 have received or accessed the group QR code 112, the second other device 123 and the third other device 133 may scan and/or capture, from the respective screens or displays of the second device 124 and the third device 134, the group QR code 112. The second other device 123 and the third other device 133 may include a scanner 108 and a scanner 109, respectively. The scanning and/or capturing of the group QR code 112 may be detected by the central server and/or processor 102 and/or other devices. The other devices may receive a notification that another device has successfully scanned and/or captured the group QR code 112, from the central server and/or processor 102 and/or from any of the devices or a third party device. For example, the other device 113 may receive a notification that the second other device 123 has scanned and/or captured the group QR code 112, from the central server and/or processor 102 and/or from the third other device 133. In response to each of the other device 113, the second other device 123 and the third other device 133 scanning and/or capturing the group QR code 112, the business cards associated with or belonging to each of the individual devices may be exchanged among the other device 113, the second other device 123 and the third other device 133.

The central server and/or processor 102 may further perform, coordinate, or facilitate one or more functions described below with respect to FIGS. 1A-1E, such as, receiving individual location information obtained from GPSes, Bluetooth, or other location based technology of the individual devices, including the device 114, the second device 124, and the third device 134, and reported by each of the individual devices to the central server and/or processor 102. The central server and/or processor 102 may further perform receiving data associated with business cards from the other device 113, the second other device 123, and the third other device 133, storing the data, backing up the data, determining whether an authorization to exchange the data has been provided by each of the second other device 123 and the third other device 133, and exchanging the data among the device or devices that have authorized, or exchanging the data among the other device 113, the second other device 123, and the third other device 133 without an authorization.

In some embodiments, instead of or in addition to the group QR code 112, the device 114 or the other device 113 may generate a group numeric code and/or a group alphanumeric code to be shared by the other device 113, the second other device 123, and the third other device 133. In some embodiments, the device 114 may determine which one of a group QR code/scannable code or a group numeric/alphanumeric code to provide or generate based on a determination of whether the other devices have videoconferencing capabilities or features. For example, if at least one of the second device 124 or the third device 134 does not have videoconferencing capabilities, the device 114 may determine to provide a group numeric/alphanumeric code. A group numeric code or a group alphanumeric code may be provided by the device 114 to each of the individual devices using voice or text such as SMS in a chat function of the teleconference setting. If both of the second device 124 and the third device 134 have videoconferencing capabilities, the device 114 may determine to show or display a group QR code using a videocamera of the device 114, onto respective screens of the second device 124 and the third device 134. Here, the second device 124 may have videoconferencing features 126 and the third device 134 may have videoconferencing features 136. In FIG. 1A, the second other device 123 and the third other device 133 may all have scanned and/or captured the group QR code 112. It is contemplated that any number of devices or entities may exchange business cards in accordance with FIG. 1A.

FIGS. 1B-1E illustrate an exchange of business cards. In some embodiments, the steps illustrated in FIGS. 1B-1E may be performed or facilitated by the central server and/or processor 102. In some embodiments, the steps illustrated in FIGS. 1B-1E may be conducted simultaneously or substantially simultaneously. For example, each of the other device 113, the second other device 123, and the third other device 133 may transmit and receive business cards simultaneously once the group QR code 112 has been scanned and/or captured by all devices. In some embodiments, the steps illustrated in FIGS. 1B-1E may be conducted sequentially. For example, as soon as a device has scanned and/or captured the group QR code 112, business cards may be exchanged among that device and other devices that have already scanned and/or captured the QR code 112. In some examples, some of the devices may scan and/or capture the group QR code 112 at a later time. As long as the scanning and/or capturing takes place before an expiration date or time of the QR code 112, each device that has scanned and/or captured the group QR code 112 may participate in the business card exchange. In some embodiments, one of the other device 113, the second other device 123, and the third other device 133 may send business cards to the other devices first before receiving business cards from the other devices. In FIG. 1B, the other device 113 may have numerous business cards, including a first business card 118 and a second business card 119, stored in the other device 113 itself, or stored in a server, database, memory, or other storage 117 that is particularly associated with the other device 113, or stored in a local device. For example, the phrase "particularly associated" may mean that the server, database, memory, or other storage 117 being specifically connected to or integrated as part of the other device 113 and/or the other device 113 may be granted a privilege to access the server, database, memory, or other storage 117. Each of the business cards stored in the other device 113 or otherwise associated with the other device 113 may be backed up in the central server and/or processor 102.

In some embodiments, the first business card 118 and the second business card 119 may both belong to the entity 110, and may have different features that are intended to appeal to different target audiences. In some embodiments, the entity 110 himself or herself may manually select a particular business card, for example, among the first business card 118, the second business card 119 and other business cards, to exchange or provide to another device, and the other device 113 may detect the manual selection and exchange or provide the selected business card in accordance with the selection. In some embodiments, the other device 113 itself may automatically, with or without an input from the entity 110, select a particular business card. The selection of a particular business card may be conducted automatically by the other device 113 based on criteria such as a level of experience, field of expertise, type of profession, position, role, relationship, and/or type of field or profession of other parties with whom business cards are being exchanged, such as the second entity 120 and the third entity 130. The relevant information of the criteria, which may be needed to select a particular business card, may be obtained by the other device 113 using a portion of business card information of the other parties, or by requesting the information from the other parties before providing the particular business card to the other parties. The selection of a particular business card may be conducted and refined by machine learning using the listed above, as inputs, and feedback provided by recipients of business cards, regarding, for example, a relevance of the selected business card.

For example, the other device 113 may select the first business card 118, which also includes further information, that may be more appropriate for another device belonging to an entity of a similar industry, profession, field, or specialty as the user of the other device 113, or is otherwise likely to utilize the services of the entity 110. The further information here may be embedded in an additional information field 111 that provides further relevant information such as a level or number of years of experience. In another example, the other device 113 may select a particular business card based on a title, position, and/or education level of an entity associated with another device. For example, if an entity associated with another device has an advanced degree such as a doctorate or a leadership position, the other device 113 may select a business card having additional details regarding one or more degrees and/or leadership positions of the entity 110. Thus, the other device 113 may select a business card with description that is a closest match with a background of the entity (including title, position, and/or education level) associated with another device. Other additional business cards besides the first business card 118 and the second business card 119 may be stored in the other device 113 itself, or stored in a server, database, memory, or other storage 117 that is particularly associated with the other device 113, or stored in a local device. For example, other additional business cards may include additional information pertaining to years of experience, levels of experience, particular fields of specialty, reviews and/or ratings, which may be selected by the other device 113 and sent to an entity in a same or similar industry, field of practice, profession, or specialty. As another example, another business card may be a business card of a company, such as a company that the entity 110 is associated with.

In some embodiments, one or more fields of a business card such as the additional information field 111 of the first business card 118 may be editable or adjustable, either automatically by the other device 113 or manually by the entity 110. For example, the additional information field 111 that may provide information regarding a job title, based on who or which customer, potential customer, or business person the first business card 118 is being sent to. In another example, information fields corresponding to degrees and/or leadership positions may either be left empty or filled in, depending on who that business card is being delivered to.

In some embodiments, in FIG. 1C, a business card delivered or transmitted by the other device 113 may be personalized to each of the entities that the business card is delivered to. For example, along with the first business card 118 or the second business card 119, a personalized greeting 115 including a name of recipient, and/or a particular service offered by the entity 110 may be delivered to the second other device 123. In some embodiments, as a further security measure, business card data received by the second entity 120 and the third entity 130 may be encrypted, after receipt, and decrypted based on one or more private keys.

Once the first business card 118 is successfully received by the second other device 123, the second other device 123 may store the first business card 118 in the second other device 123 itself, or in a server, database, memory, or other storage 127 particularly associated with the second other device 123, or in a local device. The second other device 123, or second server, database, memory, or other storage 127, or a local device, may already include a third business card 128 of the second entity 120. In some embodiments, the personalized greeting 115 may be accessible or visible upon the first business card 118 being selected. Each of the business cards stored in the second other device 123 or associated with the second other device 123 may be backed up in the central server and/or processor 102.

Once the first business card 118 is successfully received by the third other device 133, the third other device 133 may store the first business card 118 in the third other device 133 itself, or in a server, database, memory, or other storage 137 that is particularly associated with the third other device 133, or in a local device. The third other device 133, or third server, database, memory, or other storage 137, or a local device, may already have stored a fourth business card 138 of the third entity 130, along with additional business cards of the third entity 130. Each of the business cards stored in the third other device 133 or otherwise associated with the third other device 133 may be backed up in the central server and/or processor 102.

In FIG. 1D, the second other device 123 may transmit the third business card 128 to the other device 113 and the third other device 133, in a same or similar manner to the transmission of the first business card 118 or the second business card 119 from the other device 113. Once the third business card 128 is successfully received by the other device 113, the other device 113 may store the third business card 128 in the other device 113 itself, or in the server, database, memory, or other storage 117, or in a local device. Once the third business card 128 is received by the third other device 133, the third other device 133 may store the third business card 128 in the third other device 133 itself, in a third server, database, memory, or other storage 137, or a local device.

In FIG. 1E, the third other device 133 may transmit the fourth business card 138 to the other device 113 and the second other device 123, in a same or similar manner to the transmission of the first business card 118 or the second business card 119 from the other device 113. Once the fourth business card 138 is successfully received by the other device 113, the other device 113 may store the fourth business card 138 in the other device 113 itself, or in the server, database, memory, or other storage 117, or in a local device. Once the fourth business card 138 is successfully received by the second other device 123, the second other device 123 may store the fourth business card 138 in the second other device 123 itself, in a second server, database, memory, or other storage 127, or in a local device.

In some embodiments, a device may transmit, through the central server and/or processor 102, a business card from another entity not associated with the device. For example, the other device 113 may transmit to another device such as the second other device 123, the fourth business card 138 that belongs to the third other device 133. In some embodiments, the other device 113 may make such determination of whether to transmit a business card from another entity or describing another entity based on a degree of matching or similarity between a profession, specialty, title, or field of practice of the another entity and the entity to which the other device 113 is transmitting the business card to, or based on a degree of matching between professional and/or business interests between the aforementioned entities. For example, the other device 113 may make such determination based on whether the second entity 120 associated with the second other device 123 is in a similar field, specialty, or profession as the third entity 130. In other embodiments, the entity 110 may himself or herself determine, or manually select, whether to transmit the business card from another entity. The other device 113 may or may not require authorization/permission from the third entity 130 before transmitting the fourth business card 138 to another device belonging to another entity such as to the second other device 123.

FIG. 1F illustrates an alternative environment 150 to that shown in FIG. 1A. In FIG. 1F, a separate device such as the device 114 described in FIG. 1A may not be required to receive a QR code such as QR code 162 via a videoconferencing feature, meaning that the QR code 162 does not need to be scanned and/or captured by a separate device. Rather, the QR code 162 may be generated by a device 163 and either transmitted to or shown on respective screens of a second device 173 and a third device 183. Thus, once the QR code 162 is received, displayed or shown on the respective screens, the exchange of business cards to and from the device 163, the second device 173, and the third device 183 may be automatically carried out, by the central server and/or processor 102, upon the receipt of the QR code 162, with or without authorization by the device 163, the second device 173, and/or the third device 183. The exchange of the business cards may proceed as shown in FIGS. 1B-1E, and may be coordinated or conducted by the central server and/or processor 152.

FIG. 2 illustrates an example environment 200 in which touchless business card exchange may be facilitated, in particular, in a video conference setting in which a central server and/or processor 202 such as a cloud-based server and processor automatically detects a device 214, a second device 224, and a third device 234 having videoconference features 216, 226, and 236, respectively, that are all involved in a videoconference. The device 214, the second device 224, and the third device 234 may each comprise a computer, laptop, handheld device such as a mobile phone or tablet, or any device having video conference capabilities and one or more processors to perform business card exchange. The device 214, the second device 224, and the third device 234 may belong to a first entity 210, a second entity 220, and a third entity 330, respectively. The central server and/or processor 202 may automatically initiate the exchange of business cards among the device 214, the second device 224, and the third device 234, that are participating in the videoconference, without any QR or scannable code, or numeric/alphanumeric code. The exchange of business cards may be in a same or similar manner as in FIGS. 1B-1E.

Figure 3A:
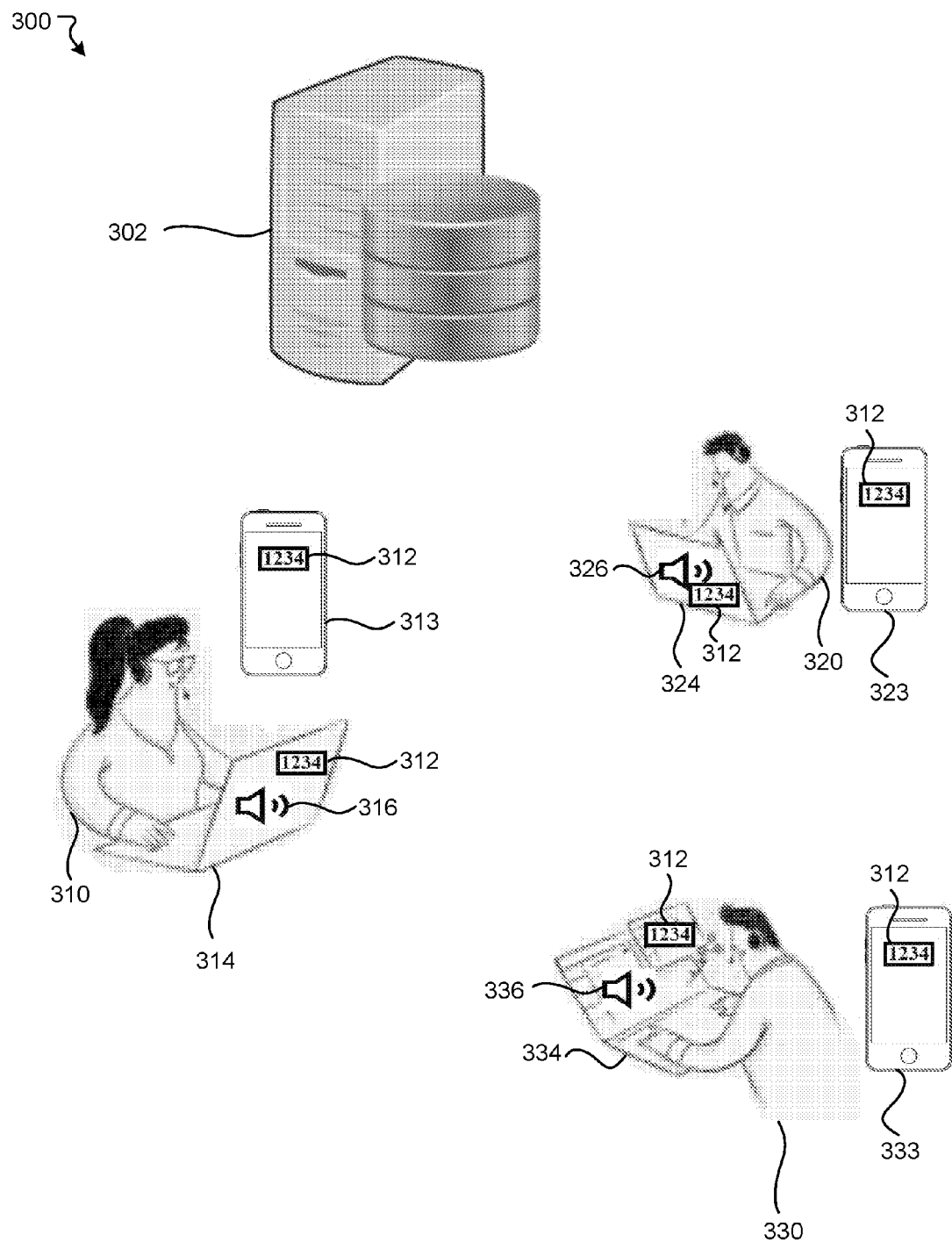
FIGS. 3A and 3B illustrate example environments in which touchless business card exchange may be facilitated, in a teleconference setting, according to some embodiments of the present disclosure.

FIG. 3A illustrates an example environment 300 in which touchless business card exchange may be facilitated, in particular, in a teleconference setting. In FIG. 3A, an entity 310, which may be a person, may utilize a device 314 having teleconferencing features 316, which may be a computer, laptop, telephone, handheld device such as a mobile phone or tablet, or any device having teleconference capabilities and data storage capabilities or otherwise being associated with a data storage. In some embodiments, the device 314 may or may not have videoconferencing features. The device 314 may create a group numeric code 312, here shown as "1234," to be shared among a group of participants in the teleconference setting, which may include a second device 324 and a third device 334 belonging to or associated with a second entity 320 and a third entity 330, respectively. The group numeric code 312 may be communicated or otherwise transmitted during the teleconference setting or be otherwise shown on a display or screen of the second device 324 and the third device 334. As shown in FIG. 3A, the teleconference setting may be conducted on a separate device from the business card exchange. The group numeric code 312 may be electronically or manually inputted into an other device 313, a second other device 323, and/or a third other device 333, from the device 314, the second device 324 and the third device 334, respectively. The actual exchange of business cards may be carried out from the participating devices, which include the other device 313, the second other device 323, and the third other device 333, using an application, module, and/or widget on each of the aforementioned devices. The other device 313, the second other device 323, or the third other device 333 may send the group numeric code 312 to a central server and/or processor 302. The central server and/or processor 302, and/or one or more of the participating devices, may check whether and when each of the participating devices have properly inputted the group numeric code 312. Once the other device 313, the second other device 323 and the third other device 333 have properly inputted the group numeric code 312, the exchange of the electronic business cards may be conducted in a same or similar manner as that described with respect to FIGS. 1B-1E.

In other embodiments, the device 314, the second device 324, and the third device 334 may also include an application, module, and/or widget that performs the business card exchange, so that the teleconference and the business card exchange may occur on the same device 314, 324, and 334, for each of the entity 310, the second entity 320, and the third entity 330, respectively. Thus, in those embodiments, the other device 313, the second other device 323, and the third other device 333 may not be required. The device 314 may send the group numeric code 312 to the central server and/or processor 302. The central server and/or processor 302, and/or one or more of the participating devices, may check whether and when each of the participating devices have properly inputted the group numeric code 312. Once the device 314, the second device 324 and the third device 334 have properly inputted the group numeric code 312, the exchange of the electronic business cards among the device 314, the second device 324 and the third device 334 may be conducted in a same or similar manner as that described with respect to FIGS. 1B-1E.

Figure 3B:
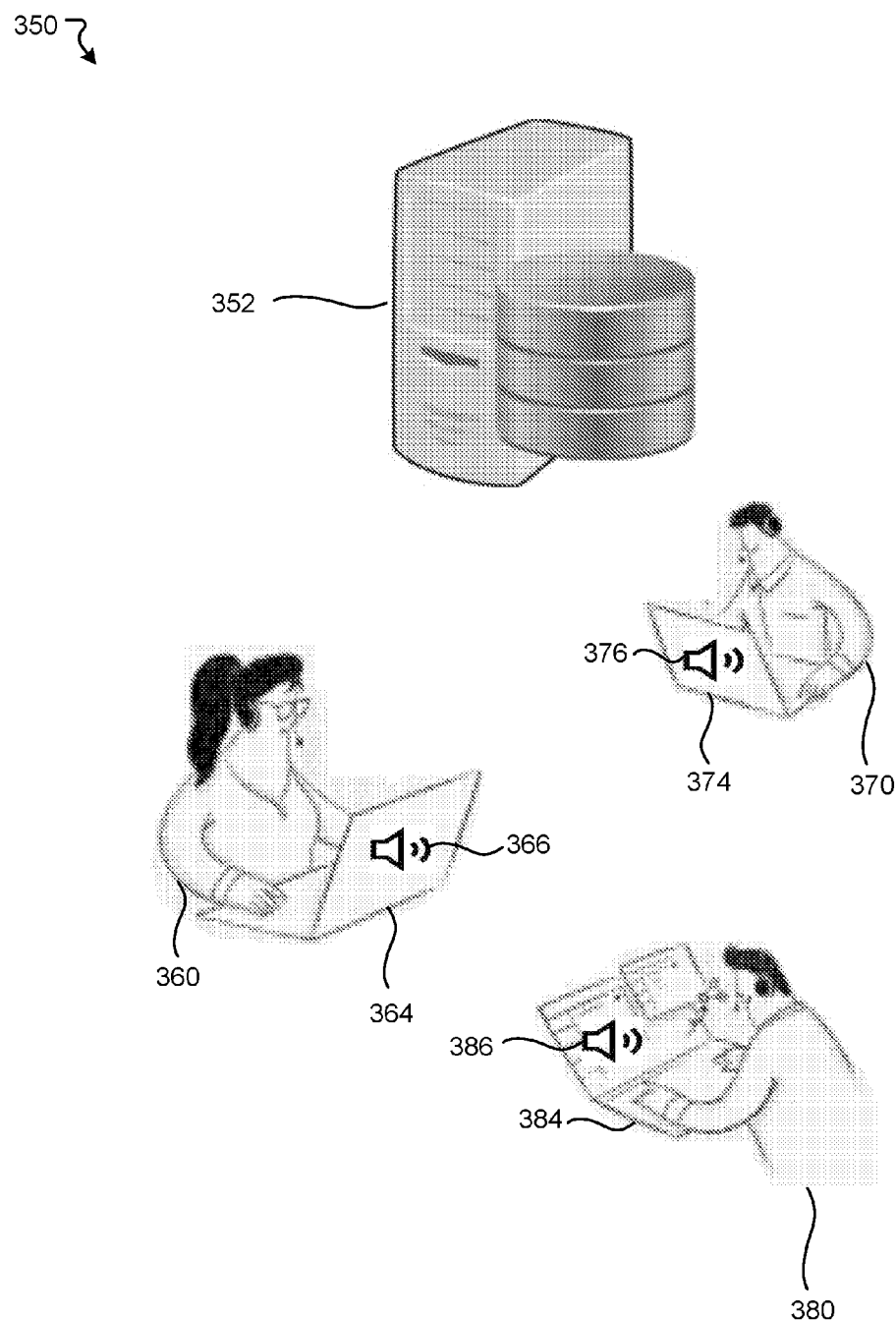

FIG. 3B illustrates an example environment 350 in which touchless business card exchange may be facilitated, in particular, in a teleconference setting, in which a central server and/or processor 352 such as a cloud-based server and processor automatically detects a device 364, a second device 374, and a third device 384 having teleconference features 366, 376, and 386, respectively, that are all involved in a teleconference. The device 364, the second device 374, and the third device 384 may each comprise a computer, laptop, handheld device such as a mobile phone or tablet, or any device having or any device having teleconference capabilities and data storage capabilities or otherwise being associated with a data storage. The device 364, the second device 374, and the third device 384 may belong to a first entity 360, a second entity 370, and a third entity 380, respectively. The central server and/or processor 352 may automatically initiate the exchange of business cards among the device 364, the second device 374, and the third device 384, that are participating in the teleconference, without any code. The actual exchange of business cards may be carried out in a same or similar manner as in FIGS. 1B-1E.

Figure 4A:
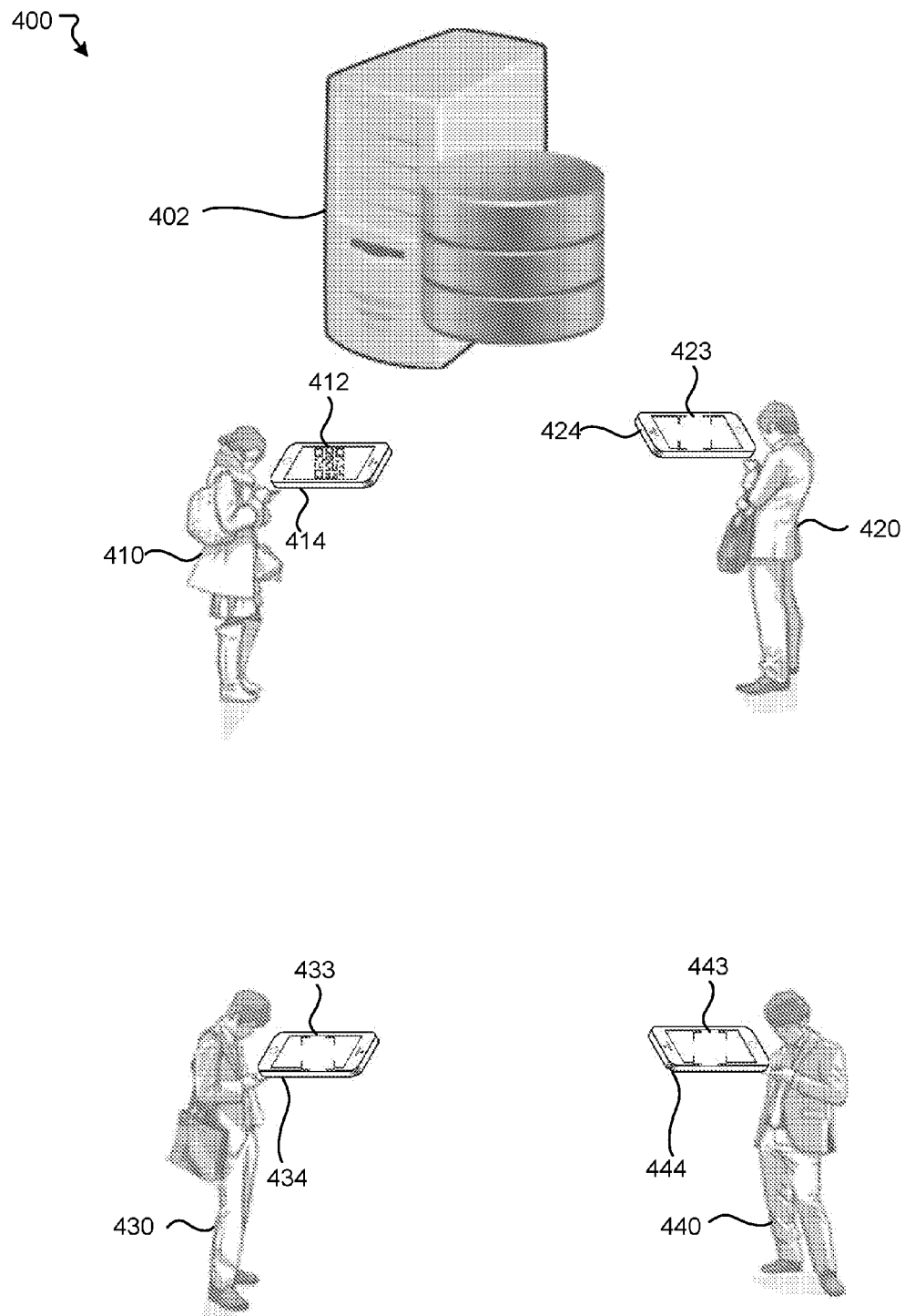
FIGS. 4A and 4B illustrate example environments in which touchless business card exchange may be facilitated, in a face-to-face setting, according to some embodiments of the present disclosure.

FIG. 4A illustrates an example environment 400 in which touchless business card exchange may be facilitated, in particular, in a face-to-face setting in which entities are within a specified radius or distance from one another, but exercising social distancing guidelines. In FIG. 4A, an entity 410, which may be a person, may utilize a device 414 which may be a computer, laptop, handheld device such as a mobile phone or tablet. The device 414 may generate a group QR code 412 and present or provide the group QR code 412 to be shared among the devices in the face-to-face setting, so that the devices are allowed to use their respective cameras or scanners to scan and/or capture the group QR code 412. In some embodiments, the device 414 may electronically transmit the group QR code 412 to each of the other devices, such that the other devices need not scan and/or capture the group QR code and automatically exchange the business cards among the group with the device 414. In some embodiments, the other devices include a second device 424, a third device 434, and a fourth device 444 belonging to or be associated with a second entity 420, a third entity 430, and a fourth entity 440, respectively. The second device 424, the third device 434, and the fourth device 444 may include a scanner 423, a scanner 433, and a scanner 443, respectively, to scan the group QR code 412. The device 414 may send the group QR code 412 to a central server and/or processor 402 such as a cloud-based server and processor, so that the central server and/or processor 402 can check whether and when each of the devices have scanned and/or captured the group QR code 412. Once the second device 424, the third device 434, and the fourth device 444 have scanned and/or captured the group QR code 412, the second device 424, the third device 434, and the fourth device 444 may exchange electronic business cards, as coordinated or conducted at least in part by a central server and/or processor 402, in a same or similar manner as that described with respect to FIGS. 1B-1E.

Figure 4B:
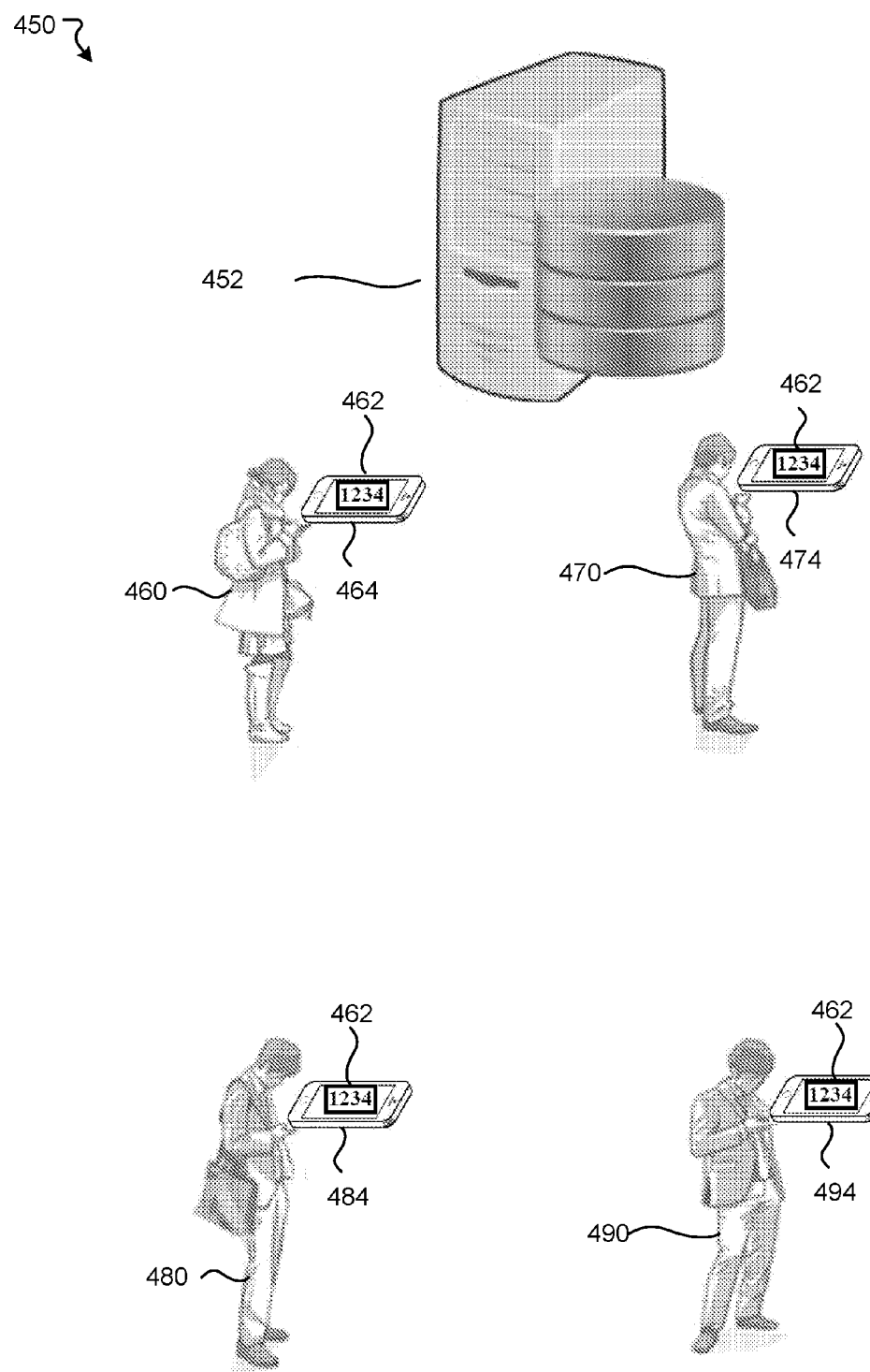

In some embodiments, as shown in FIG. 4B, in the face-to-face setting, instead of or in addition to a group QR code, a device 464 may generate a group numeric code 462 or a group alphanumeric code. A second device 474, a third device 484, and a fourth device 494 may be informed of the group numeric code or the group alphanumeric code by voice, for example. A central server and/or processor 452 may receive the group numeric code 462, and check whether and when each of the devices have inputted the group numeric code 462. Once the second device 474, the third device 484, and the fourth device 494 input the group numeric code or the group alphanumeric code, and the input is detected by the central server and/or processor 452, the exchange of business cards may be initiated among the group with the device 464, in a same or similar manner as that described with respect to FIGS. 1B-1E. The device 464, the second device 474, the third device 484, and the fourth device 494 may belong to or be associated with an entity 460, a second entity 470, a third entity 480, and a fourth entity 490, respectively.

Figure 5:
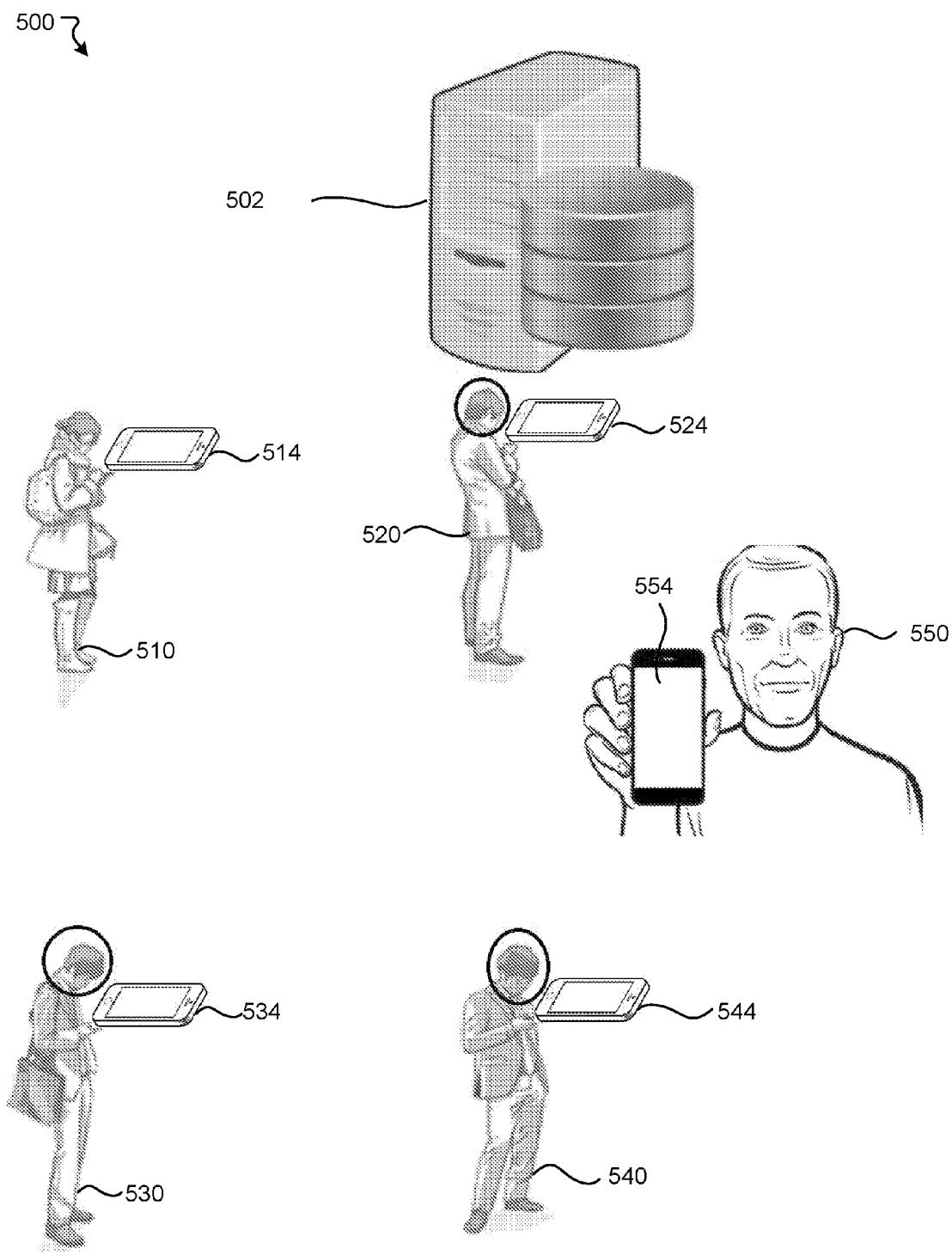
FIG. 5 illustrates an example environment in which touchless business card exchange may be facilitated, in a face-to-face setting, according to some embodiments of the present disclosure.

FIG. 5 illustrates an example environment 500 in which touchless business card exchange may be facilitated, in particular, in a face-to-face setting in which entities are within a specified radius or distance from one another, but preferably exercising at least loose social distancing guidelines. In FIG. 5, an entity 510, which may be a person, may utilize a device 514, which may be a computer, laptop, handheld device such as a mobile phone or tablet. A central server and/or processor 502 may perform or facilitate one or more functions of business card exchange, such as, receiving locations determined by GPSes, Bluetooth, or other location based technologies of the device 514 and other devices, providing information of which devices are within the specified radius or distance, receiving data associated with business cards from the device and other devices, receiving a selection of other devices from the device 514, determining whether an authorization to exchange the data has been provided by each of the other devices, and exchanging the data among the one or more devices that have provided the authorization. The device 514, together with the central server or the processor 502, may utilize GPS, Bluetooth, or other location based technologies, to determine one or more devices nearby, such as within a threshold distance or radius from the device 514, or corresponding entities of the nearby devices, with which to exchange business cards. For example, the device 514 may select a subset of the devices nearby, which may include all of or a portion of the devices or corresponding entities within a specified radius or distance from the entity 510. In FIG. 5, the device 514 has selected a second entity 520 corresponding to a second device 524, a third entity 530 corresponding to a third device 534, and a fourth entity 540 corresponding to a fourth device 544, but has left a fifth entity 550 corresponding to the fifth device 554 unselected. The selection of entities may not require a QR code, numeric code, or alphanumeric code in FIG. 5. Once the second device 524, the third device 534, and the fourth device 544 are selected, the second device 524, the third device 534, and the fourth device 544 may form a virtual gathering and exchange electronic business cards in a same or similar manner as described in FIGS. 1B-1E, and/or FIG. 2.

Figure 6:
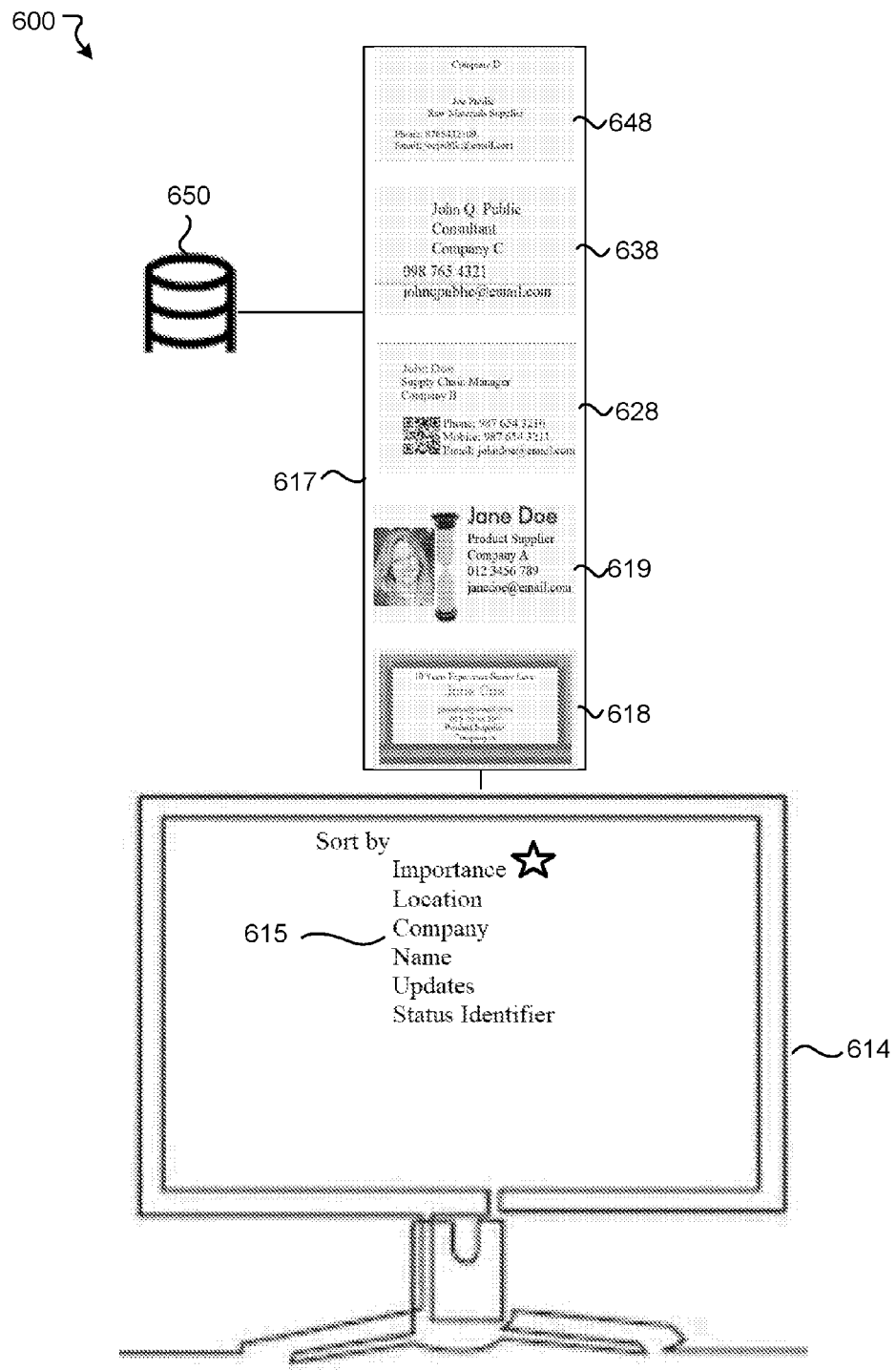
FIGS. 6-7 illustrate exemplary implementations in accordance with any of the example environments described with respect to FIGS. 1A, 1F, 2, 3A, 3B, 4A, 4B, and/or 5.
Figure 7:
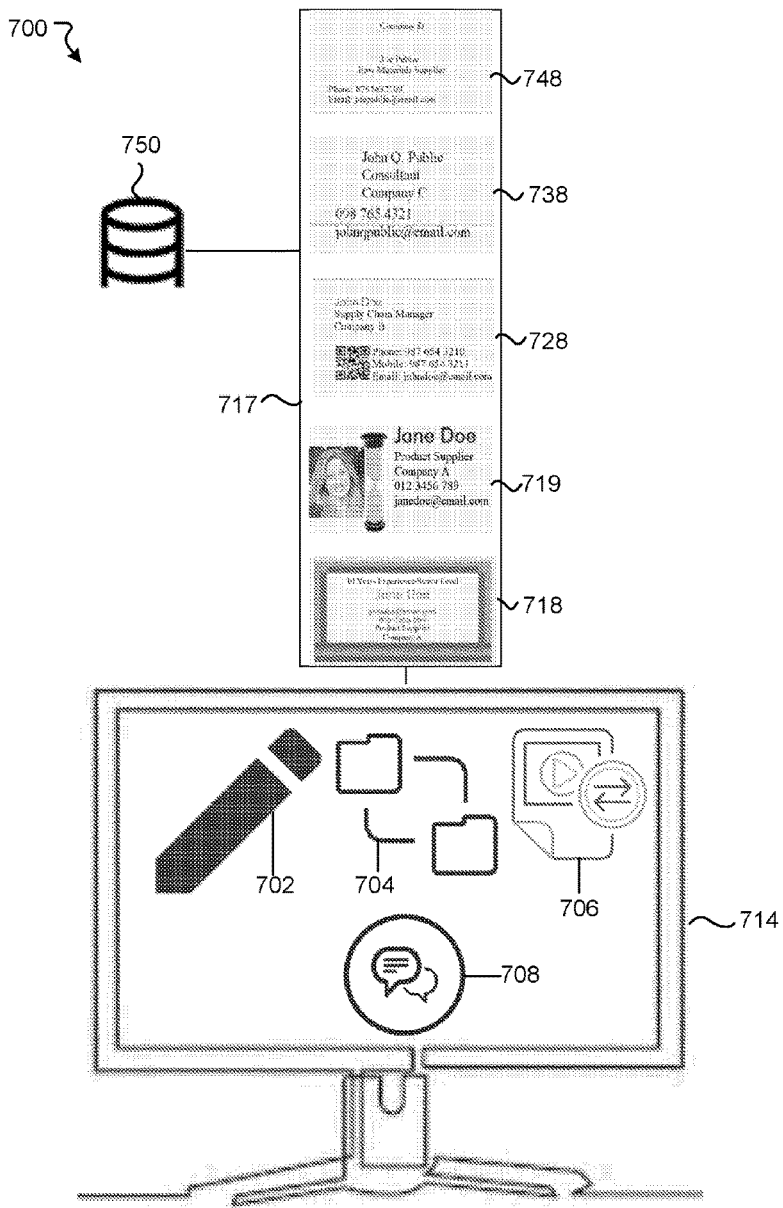

FIGS. 6 and 7 illustrate exemplary implementations 600 and 700, respectively, in accordance with any of the example environments described with respect to FIGS. 1A, 2, 3A, 3B, 4A, 4B, and/or 5. In FIG. 6, a device 614 may be implemented, for example, as the device 114, 214, 314, 414, or 514. The device 614 may store different business cards including a first business card 618 and a second business card 619 of an entity associated with the device 614, along with a third business card 628, a fourth business card 638, and a fifth business card 658 associated with other devices. In some embodiments, a server, database, memory, or other storage 617 may be part of or particularly associated with the device 614. In FIG. 6, one or more processors of the device 614 may sort the business cards by criteria such as importance, location, company, name, most recent updates, and/or status identifier such as whether an entity associated with a business card is currently inactive or not working. In some examples, a importance may be set automatically by the device 614 based on factors such as a profession, field, or specialty, a degree of matching or similarity between the entity associated with the device 614 and the entity or entities associated with a business card. In other examples, a menu 615 may be provided as part of a user interface to allow a user to sort the business cards. In FIG. 6, data associated with business cards stored, for example, in the device 614, may be backed up to a second storage 650.

In FIG. 7, a device 714, which be implemented, for example, as the device 114, 214, 314, 414, 514, or 614 may store different business cards including a first business card 718 and a second business card 719 of an entity associated with the device 714, along with a third business card 728, a fourth business card 738, and a fifth business card 748 associated with other devices. In some embodiments, a server, database, memory, or other storage 717 may be part of or particularly associated with the device 714. In some embodiments, the server, database, memory, or other storage 717 may store the first business card 718, the second business card 719, the third business card 728, and the fourth business card 738, and the fifth business card 748. In FIG. 7, one or more processors of the device 714 may provide editing features 702, file exchange features 704, multimedia exchange features 706, and chat features 708. In some examples, the editing features 702 may allow the device 714 to edit information only in the first business card 718 and the second business card 719, which are business cards belonging to a user of the device 714. In other alternative examples, the editing features 702 may allow the device 714 to edit information of business cards belonging to other people, with or without permission. The device 714 may further provide a feedback, review, or rating to an entity or entities associated with a business card, such as the fifth business card 748. The device 714 may or may not publish the changes to other devices.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 8:
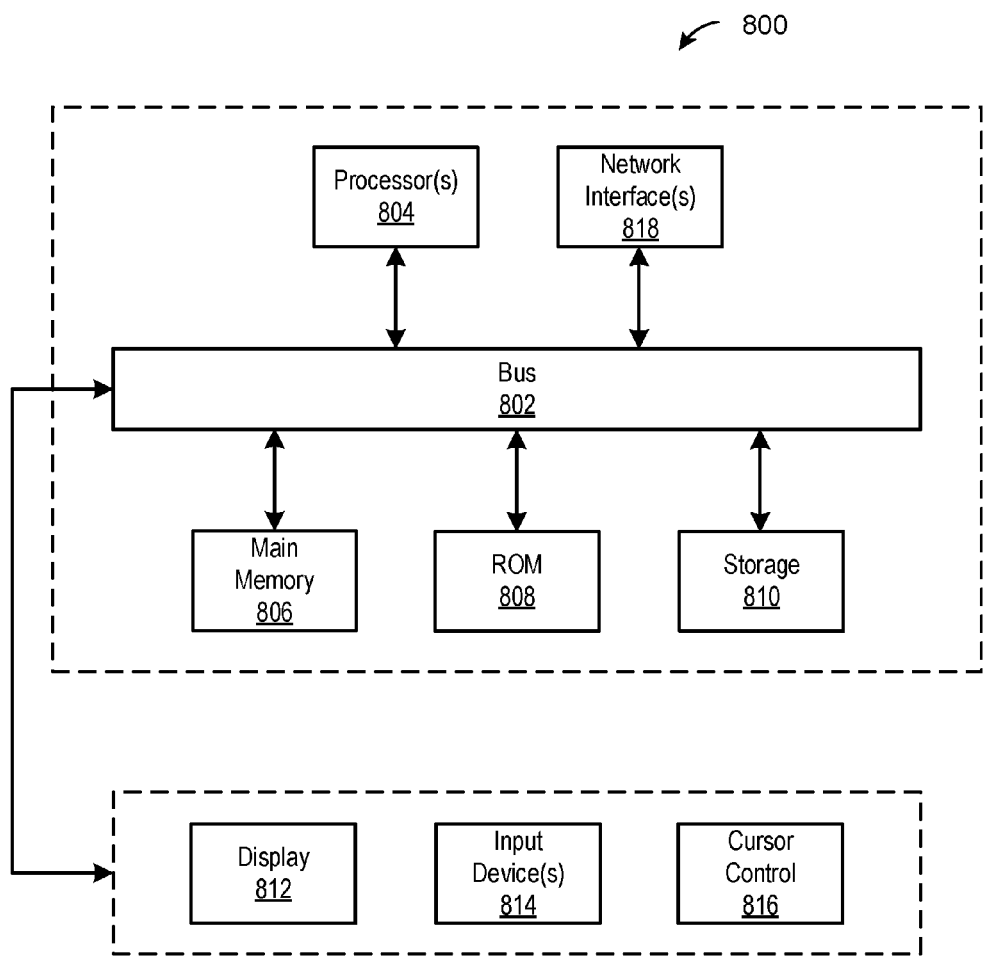
FIG. 8 is a diagram of an example computer system for implementing the features disclosed herein.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. A description that a device performs a task is intended to mean that one or more of the hardware processor(s) 804 performs.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to output device(s) 812, such as a cathode ray tube (CRT) or LCD display (or touch screen), for displaying information to a computer user. Input device(s) 814, including alphanumeric and other keys, are coupled to bus 802 for communicating information and command selections to processor 804. Another type of user input device is cursor control 816. The computer system 800 also includes a communication interface 818 coupled to bus 802.

The invention claimed is:

1. A computing system comprising:
  a server configured to store data of business cards from entities associated with client devices, the data comprising, for each entity of the entities, any of a name, a title, contact information associated with the name, and an occupation associated with the name;
  one or more processors; and
  a memory storing instructions that, when executed by the one or more processors, causes the one or more processors to perform:
    receiving a group QR code or scannable code created by a client device of the client devices, the client device being associated with a first user;
    transmitting the group QR code or scannable code to other devices associated with the client devices to indicate an invitation to exchange data, the other devices being associated with one or more second users;
    detecting scans or captures of the group QR code or the scannable code from second client devices, wherein at least one of the second client devices is associated with a second user of the second users, the second client devices comprising a subset of the client devices and being distinct from the other devices, wherein each of the scans or captures of the group QR code or the scannable code indicates an approval of the invitation to exchange the data from the second client devices;
    in response to detecting the scans or captures, automatically exchanging the data, at the server, among the second client devices and the client device; and
    syncing, to the second client devices and the client device, the exchanged data from the server.

2. The computing system of claim 1, wherein the instructions further cause the computing system to perform:
  setting an expiration time by which the second client devices are to scan the group QR code or the scannable code; and
  the detecting of the scans or captures of the group QR code or the scannable code from the second client devices comprises:
    determining whether the scans or captures occurred before the expiration time; and
    automatically exchanging the data, at the server, among the second client devices and the client device in response to determining that the scans or captures occurred before the expiration time.

3. The computing system of claim 1, wherein the instructions further cause the computing system to perform:
  in response to syncing, to the second client devices and the client device, the exchanged data, backing up the synced exchanged data at the server.

4. The computing system of claim 1, wherein the instructions further cause the computing system to perform:
  sorting, at each of the second client devices and the client device, the data of the business cards based on respective importances of the business cards.

5. The computing system of claim 4, wherein the instructions further cause the computing system to perform:
  detecting, at the server, a change of an importance of one of the business cards; and
  storing the change of the importance at the server.

6. The computing system of claim 1, wherein the instructions further cause the computing system to perform:
  in response to syncing, to the second client devices and the client device, the exchanged data, encrypting the data; and
  decrypting the encrypted data using one or more private keys.

7. A nontransitory computer readable storage medium including instructions that, when executed by one or more processors of a computing system, cause the computing system to perform a method comprising:
  storing, in a server of the computing system, data of business cards from entities associated with client devices, the data comprising, for each entity of the entities, any of a name, a title, contact information associated with the name, and an occupation associated with the name;
  receiving a group QR code or scannable code created by a client device of the client devices, the client device being associated with a first user;
  transmitting the group QR code or scannable code to other devices associated with the client devices to request an exchange of the data among the client devices to indicate an invitation to exchange data, the other devices being associated with one or more second users;
  detecting scans or captures of the group QR code or the scannable code from second client devices, wherein at least one of the second client devices is associated with a second user of the second users, the second client devices comprising a subset of the client devices and being distinct from the other devices, wherein each of the scans or captures of the group QR code or the scannable code indicates an approval of the invitation to exchange the data among the second client devices;
  in response to detecting the scans or captures, automatically exchanging the data, at the server, among the second client devices and the client device; and
  syncing, to the second client devices and the client device, the exchanged data from the server.

8. The nontransitory computer readable storage medium of claim 7, wherein the instructions further cause the computing system to perform:
  setting an expiration time by which the second client devices are to scan the group QR code or the scannable code; and
  the detecting of the scans or captures of the group QR code or the scannable code from the second client devices comprises:

determining whether the scans or captures occurred before the expiration time; and automatically exchanging the data, at the server, among the second client devices and the client device in response to determining that the scans or captures occurred before the expiration time.

9. The nontransitory computer readable storage medium of claim 7, wherein the instructions further cause the computing system to perform:

in response to syncing, to the second client devices and the client device, the exchanged data, backing up the synced exchanged data at the server.

10. The nontransitory computer readable storage medium of claim 7, wherein the instructions further cause the computing system to perform:

sorting, at each of the second client devices and the client device, the data of the business cards based on respective importances of the business cards;

detecting, at the server, a change of an importance of one of the business cards; and storing the change of the importance at the server.

11. A computing system comprising:

a server configured to store data of business cards from entities associated with client devices, the data comprising, for each entity of the entities, any of a name, a title, contact information associated with the name, and an occupation associated with the name;

one or more processors; and a memory storing instructions that, when executed by the one or more processors, causes the one or more processors to perform:

receiving a group code created by a client device of the client devices, the group code comprising a group numeric code or a group alphanumeric code, the client device being associated with a first user;

transmitting the group code to other devices associated with the client devices to indicate an invitation to exchange data, the other devices being associated with one or more second users;

detecting inputs of the group code from second client devices, wherein at least one of the second client devices is associated with a second user of the second users and each of the inputs of the group code indicates an approval of the invitation to exchange the data from the second client devices;

in response to detecting the inputs, automatically exchanging the data, at the server, among the client device, and the second client devices or the other devices; and syncing, to the client device, and the second client devices or the other devices, the exchanged data from the server.

12. The computing system of claim 11, wherein the instructions further cause the computing system to perform:

setting an expiration time by which the second client devices or the other devices are to input the group code; and the detecting of the inputs of the group code from the second client devices or the other devices comprises:

determining whether the inputs occurred before the expiration time; and automatically exchanging the data, at the server, among the client device, and the second client devices or the other devices, in response to determining that the inputs occurred before the expiration time.

13. The computing system of claim 11, wherein the instructions further cause the computing system to perform:

in response to syncing, to the client device, and the second client devices or the other devices, the exchanged data, backing up the synced exchanged data at the server.

14. The computing system of claim 11, wherein the instructions further cause the computing system to perform:

sorting, at each of the client device, and the second client devices or the other devices, the data of the business cards based on respective importances of the business cards.

15. The computing system of claim 14, wherein the instructions further cause the computing system to perform:

detecting, at the server, a change of an importance of one of the business cards; and storing the change of the importance at the server.

16. The computing system of claim 11, wherein the instructions further cause the computing system to perform:

in response to syncing, to the client device, and the second client devices or the other devices, the exchanged data, encrypting the data; and decrypting the encrypted data using one or more private keys.

17. A nontransitory computer readable storage medium including instructions that, when executed by one or more processors of a computing system, cause the computing system to perform a method comprising:

storing, in a server of the computing system, data of business cards from entities associated with client devices, the data comprising, for each entity of the entities, any of a name, a title, contact information associated with the name, and an occupation associated with the name;

receiving a group code created by a client device of the client devices, the client device being associated with a first user, and the group code comprising a group numeric code or a group alphanumeric code;

transmitting the group code to other devices associated with the client devices to indicate an invitation to exchange data, the other devices being associated with one or more second users;

detecting inputs of the group code from second client devices, wherein at least one of the second client devices is associated with a second user of the second users, and each of the inputs of the group code indicates an approval of the invitation to exchange the data from the second client devices or the other devices;

in response to detecting the inputs, automatically exchanging the data, at the server, among the client device, and the second client devices or the other devices; and syncing, to the client device, and the second client devices or the other devices, the exchanged data from the server.

18. The nontransitory computer readable storage medium of claim 17, wherein the instructions further cause the computing system to perform:

setting an expiration time by which the second client devices or the other devices are to input the group code; and the detecting of the inputs of the group code from the second client devices or the other devices comprises:

determining whether the inputs occurred before the expiration time; and automatically exchanging the data, at the server, among the client device, and the second client devices or the other devices, in response to determining that the inputs occurred before the expiration time.

19. The nontransitory computer readable storage medium of claim 17, wherein the instructions further cause the computing system to perform:
- in response to syncing, to the client device, and the second client devices or the other devices, the exchanged data, backing up the synced exchanged data at the server.

20. The nontransitory computer readable storage medium of claim 17, wherein the instructions further cause the computing system to perform:
- sorting, at each of the client device, and the second client devices or the other devices, the data of the business cards based on respective importances of the business cards;
- detecting, at the server, a change of an importance of one of the business cards; and
- storing the change of the importance at the server.

* * * * *